Nov. 26, 1935.　　　A. F. HOWE　　　2,022,115
VARIABLE SPEED PULLEY
Filed Aug. 10, 1934　　　2 Sheets-Sheet 2
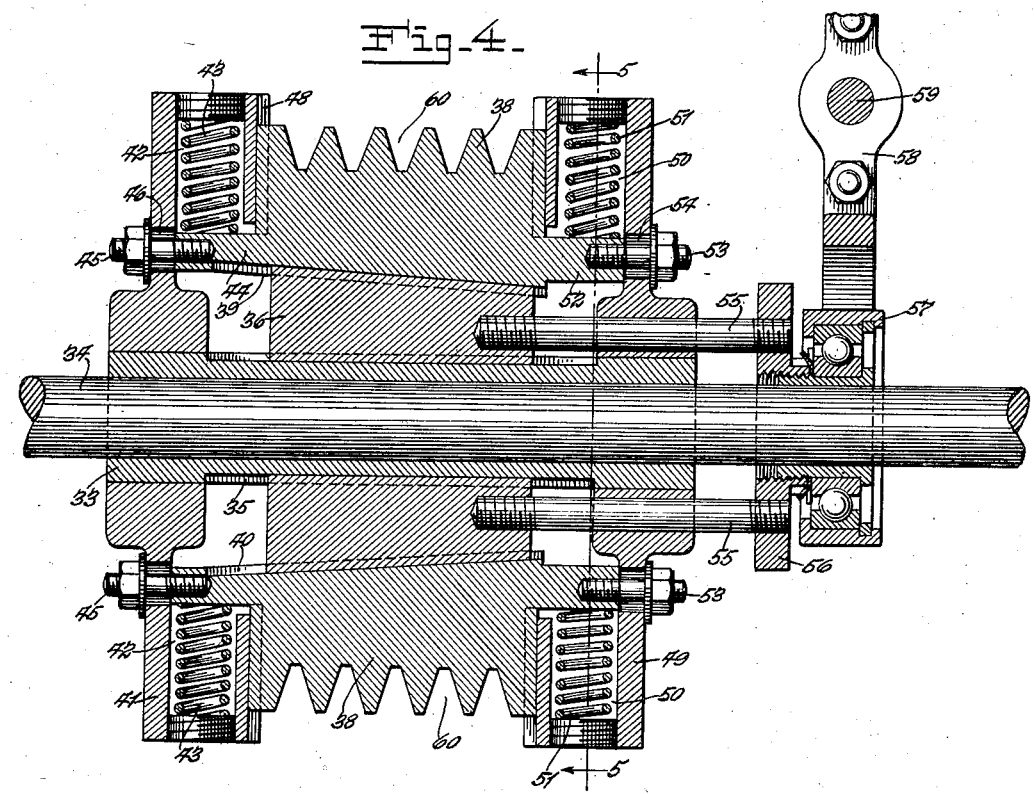
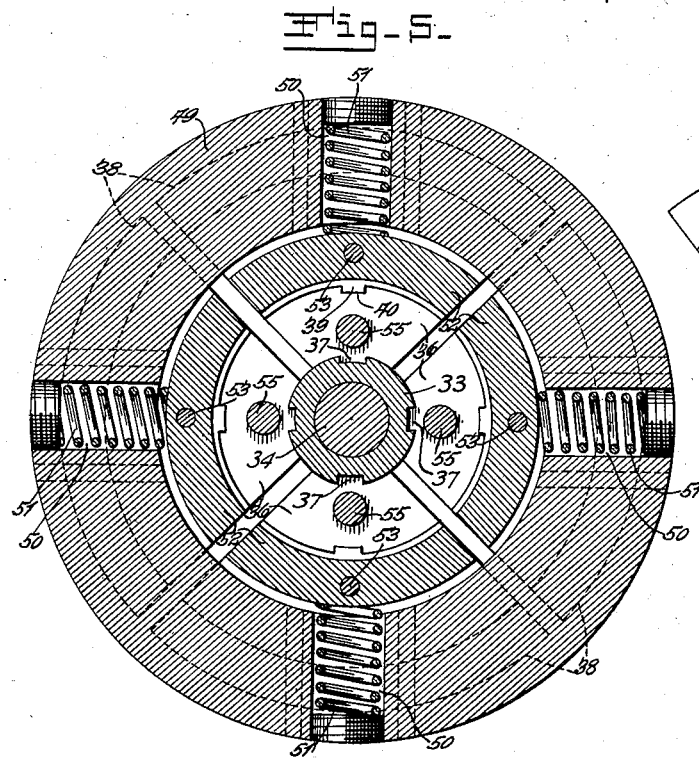
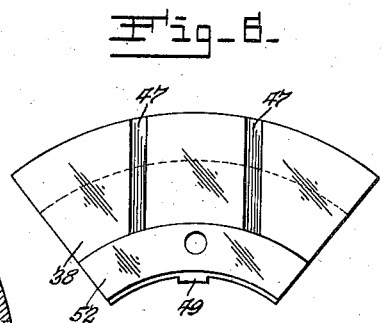
Inventor
Andrew F. Howe
by Pyppey & Kingsland
His Attorneys Patented Nov. 26, 1935

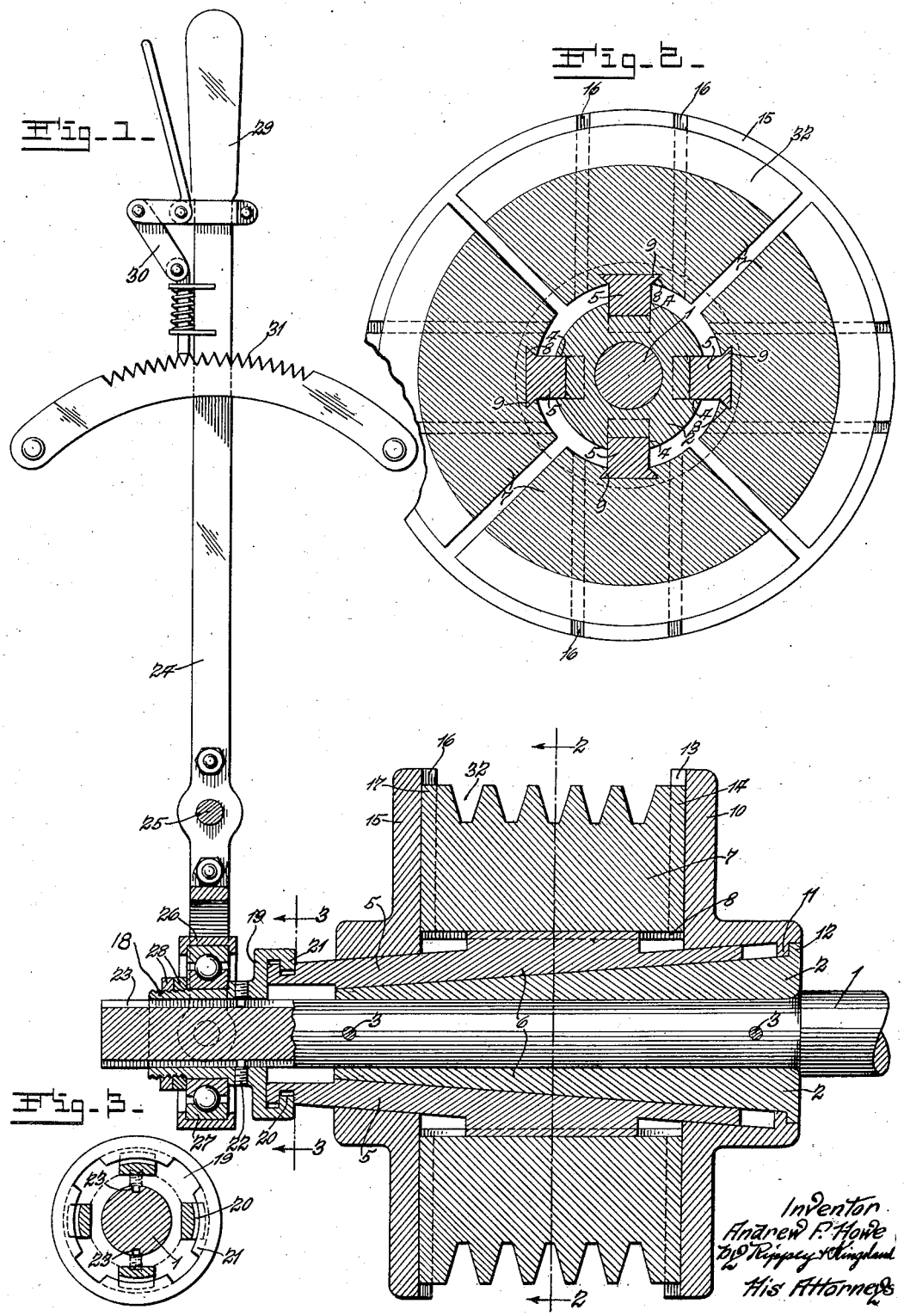

2,022,115

UNITED STATES PATENT OFFICE 2,022,115

VARIABLE SPEED PULLEY

Andrew F. Howe, University City, Mo.

Application August 10, 1934, Serial No. 739,237

4 Claims. (Cl. 74—230.21)

This invention relates to variable speed pulleys.

Objects of the invention are to provide an improved variable speed pulley comprising a series of arcuate segments having belt engaging surfaces; to provide an improved mounting for said segments including longitudinally movable parts supported about the pulley shaft; to provide means for locking said parts with the respective pulley segments whereby said parts and said segments will rotate together and in unison; and to provide means for moving said parts to different longitudinally adjusted positions to move said pulley segments radially from or toward the axis of the pulley to enlarge or reduce the size of the pulley while the pulley is operating.

Another object of the invention is to provide an improved variable speed pulley comprising a series of arcuate segmental sections and supports for said segmental sections mounted for longitudinal sliding movements about the supporting shaft and having improved connections with said shaft and said segmental sections whereby the pulley and the shaft will be rotated together when either is rotated and the pulley may be enlarged or reduced while in motion.

Various other objects and advantages will be apparent from the following description, reference being made to the annexed drawings, in which—

Fig. 1 is a sectional view of my improved pulley and its mounting, the operating device for spreading or converging the pulley segments being in elevation.

Fig. 2 is a transverse sectional view on the line 2—2 of Fig. 1.

Fig. 3 is a cross sectional view on the line 3—3 of Fig. 1.

Fig. 4 is a longitudinal sectional view showing a variation in the form of the invention.

Fig. 5 is a cross sectional view on the line 5—5 of Fig. 4.

Fig. 6 is an end elevation of one of the pulley segments.

The shaft 1 has a tapered sleeve or bushing 2 rigidly attached thereto by fasteners 3. The sleeve or bushing 2 is formed with a series of longitudinal grooves 4, the bottom walls of which are parallel with the outer surface of said sleeve or bushing. An annular series of elongated slide members 5 are mounted around the sleeve or bushing 2 for longitudinal sliding movements along said sleeve or bushing and have ribs 6 engaging in said grooves 4. By this arrangement, the slide members 5 will be moved radially when they are moved longitudinally along the sleeve or bushing 2, being moved outwardly when they are moved toward the larger end of said sleeve or bushing and inwardly when they are moved toward the smaller end of said sleeve or bushing. By this construction and arrangement, the annular series of slide members 5 are rotated in unison with the shaft 1, irrespective of whether said shaft is the driven or driving member.

An annular series of arcuate segments 7 are assembled on and in connection with the slide members 5, having in their inner sides longitudinal dovetail grooves 8 receiving similar dovetail shaped ribs or flanges 9 integral with the outer sides of the slide members 5 and having their outer edges parallel with the axis of the shaft 1. This constitutes an embodiment of means for holding the pulley segments 7 attached to the slide members 5 and for rotating said pulley segments by said members 5, or vice versa.

An end disc or plate 10 is mounted on the larger end of the sleeve or bushing 2, being attached thereto by lugs 11 engaging in the grooves 4 and abutting against an end flange 12 rigid with the sleeve or bushing 2. The disc or plate 10 has a series of grooves 13 in which ribs 14 integral with the adjacent ends of the pulley segments 7, engage. The ribs 14 on each pulley segment are parallel with each other and the grooves 13, in which said ribs engage, must also be parallel. An additional disc or plate 15 is mounted on the opposite end of the sleeve or bushing 2 and has a series of grooves 16 receiving ribs 17 on the adjacent ends of the respective pulley segments 7. The ribs 17 on each pulley segment are parallel with each other and with the ribs 14 on the opposite end of said segment, requiring that the grooves 16 receiving the ribs 17 on each pulley segment also be parallel with each other and with the opposite grooves 13.

The slide members 5 extend for sliding movements through the hub of the disc or plate 15 and also into the hub of the disc or plate 10. The inner surfaces of the discs or plates 10 and 15, with which the outer surfaces of the slide members 5 engage, are parallel with the tapered outer surface of the sleeve or bushing 2, so that it is possible for the slide members 5 to move freely and yet be held closely against the sleeve or bushing 2 by the discs or plates 10 and 15.

A sleeve 18 is mounted for longitudinal sliding movements on the shaft 1 and on its inner end has a rigid radial flange 19 constituting an abutment for the ends of the slide members 5. The outer ends of the slide members 5 have grooves 20 receiving inwardly extended portions 21 rigid with the flange 19. Key members 22, in rigid connection with the sleeve 18, engage in longitudinal grooves 23 in the shaft 1, thereby rotating said sleeve 18 with said shaft and leaving said sleeve free to be moved longitudinally along said shaft in order to move the slide members 5.

A lever 24 mounted on a pivot 25 has one end connected with a ring 26 mounted on an antifriction bearing 27, which is secured on the sleeve 18 by a retaining device 28. The lever 24 is provided with a handle 29 equipped with a familiar type of detent mechanism 30 adapted to be engaged with and released from a segmental rack 31. The lever 24 may be moved to different adjusted positions by releasing the detent device 30 from the rack 31 and will be retained in any of its adjusted positions by engaging said detent device with said rack. Thus, by operating the lever 24 the slide members 5 may be moved longitudinally in either direction—toward the larger end or toward the smaller end of the sleeve 2—in order to enlarge or reduce the size of the pulley comprising the arcuate pulley segments 7.

The pulley segments 7 may be provided with peripheral grooves 32 arranged so that the grooves on each segment aline with the grooves on adjacent segments. These grooves may receive V-belts, constituting driving connections engaged with my improved variable speed pulley.

In the variation of the invention shown on sheet 2 of the drawings, which is another means of accomplishing the same result, a sleeve or bushing 33 is mounted rigidly on a rotary shaft 34 and is provided with a series of longitudinal grooves 35, which are parallel with each other and with the axis of said shaft.

An annular series of slide members 36 are mounted about the sleeve 33 and each has a tongue 37 engaging in one of the grooves 35.

An annular series of arcuate segmental pulley sections 38 are mounted about the slides 35, each having a tongue 39 engaging in a longitudinal groove 40 in the outer surface of the slides 36 on which the respective segments 38 are mounted.

The outer surfaces of the sides 36 are inclined from one end to the other and the inner surfaces of the pulley segments 38 are similarly inclined, as a consequence of which construction longitudinal movements of the slides 36 in one direction will move the pulley segments 38 outwardly and longitudinal movements of said slides in the opposite direction will permit the pulley segments to be moved inwardly. In this way, the size or circumference of the pulley may be increased or reduced while the pulley is operating, as required by the nature of the environment in which the pulley is embodied.

A disc or plate 41 is attached to one end of the sleeve or bushing 33 and has an annular series of sockets 42, in each of which a spring 43 is mounted. The springs 43 press against extensions 44 on the adjacent ends of the segments 38 and thereby press the segments 38 inwardly. Screws 45, attached to the ends of the extensions 44, operate in slots 46 in the disc or plate 41. The end of each segment 38 that is adjacent to the disc or plate 41 has a pair of parallel grooves 47 receiving ribs 48 on the disc or plate 41, thus locking the parts against relative rotation without interfering with radial inward and outward movement of the segments 38.

A disc or plate 49, similar to the disc or plate 41, is mounted on the opposite end of the sleeve or bushing 33 and has an annular series of spring sockets 50, in each of which a spring 51 is mounted. The inner ends of said springs 51 press against extensions 52 on adjacent ends of the segments 38. Screws 53, attached to the ends of the extensions 52, operate in slots 54 in the disc or plate 49.

Rods 55 extend for sliding movements through the disc or plate 49 and are engaged with the respective slide members 36. The outer ends of the rods 55 are engaged with a member 56 mounted for sliding movements on the shaft 34 and engaged by a ring 57 connected with an operating lever 58 mounted on a pivot 59 and being controlled and operated the same as the lever 24.

With this construction it is obvious that operation of the lever 58 in one direction will move the slide members 36 longitudinally in one direction and thereby move the segments 38 outwardly against the pressure of the springs 43 and 51; while opposite operation of said lever 58 will move the slide members 36 longitudinally in the opposite direction and permit the springs 43 and 51 to move the segments 38 inwardly. Thus, the segments 38 are adjusted and controlled to provide a pulley of the desired diameter. The surfaces of the segments 38 may be provided with grooves 60 similar to the grooves 32.

It must now be apparent that in either embodiment of the invention shown the pulley segments may be moved radially toward and from the axis of the shaft about which they are mounted and rigidly supported in their different adjustments. In the construction shown in Figs. 1 and 2, the slide members 5 actuate the pulley segments in both directions and retain the pulley segments in their adjusted positions; whereas in the construction shown in Figs. 4 and 5, the slide members 36 move the pulley segments outwardly and the springs 43 and 51 move the segments inwardly.

The invention may be varied in other particulars without departure from the nature and principle thereof. I do not restrict myself unessentially, but what I claim and desire to secure by Letters Patent is:

1. A variable speed pulley comprising an annular series of pulley segments, a shaft, and walls rigid with said shaft, interlocks between said pulley segments and said end walls preventing relative longitudinal displacement of said pulley segments and guiding said pulley segments in inward and outward radial movements, slide members mounted between said pulley segments and said shaft for moving said pulley segments radially outwardly, and means for moving said pulley segments inwardly toward the axis of said shaft while the pulley is operating or stationary.

2. In combination with a shaft, a tapered sleeve attached to said shaft and having a series of grooves extending from the smaller end toward the larger end of said sleeve, a pulley end plate attached to the larger end of said sleeve, a cooperating pulley end plate mounted on the smaller end of said sleeve, a slide member mounted for longitudinal sliding movements in each of said grooves and extending through said last named plate and into said first named plate, pulley segments mounted between said plates and having dovetail connection with said slides respectively, and means for moving said slides longitudinally.

3. A pulley of the character described comprising a tapered bushing having longitudinal grooves extending from its smaller toward its larger end, a plate mounted on the large end of said pulley around adjacent portions of said grooves, lugs rigid with said plate engaging in said grooves, an additional plate mounted on the smaller end of said bushings and surrounding adjacent portions of said grooves, slides mounted in said grooves respectively and extending through said second named plate and into said first named plate and being held in said grooves by both of said plates, an annular series of arcuate pulley segments mounted for radial sliding movement between said plates, dovetail connection between said slides and said pulley segments respectively for moving said pulley segments radially inwardly and outwardly by opposite endwise movements of said slides, and mechanism for moving said slides longitudinally.

4. A pulley of the character described comprising a tapered bushing having longitudinal grooves in its outer surface with the walls thereof inclined relative to the axis of said bushing, slides mounted for longitudinal movements in said grooves respectively, an end plate surrounding one end of said slides and holding said slides in said grooves, devices holding said plate from turning relative to said bushing, an end plate mounted on the smaller end of said bushing around and engaging said slides, dovetail ribs on said slides between said plates, pulley segments mounted for inward and outward radial movements between said plates and having dovetail grooves receiving said dovetail ribs, and means for moving said slides longitudinally.

ANDREW F. HOWE.